United States Patent Office 3,108,902
Patented Oct. 29, 1963

3,108,902
ORGANIC ANHYDRIDE REACTIONS AND
PRODUCTS RESULTING THEREFROM
Joseph R. Galli and Robert B. Johnson, Wichita, Kans., assignors to Boeing Company, a corporation of Delaware
No Drawing. Filed Apr. 10, 1958, Ser. No. 727,535
8 Claims. (Cl. 117—126)

This invention relates to organic chemical anhydrides. In a more specific aspect this invention relates to reactions of organic anhydrides, especially reactions with materials rigid of structure as distinguished from a readily flowable fluid, such materials having hydroxyl groups on the surface, and/or polymerized or polymerizable chemical compositions, especially polyester polymers or resins. In a still more specific aspect this invention relates to linking together polymerized materials and so-called filler materials therefor and/or materials the surface of which is covered with polymerized resins, more specifically to chemically and/or physically linked materials rigid of structure as distinguished from a readily flowable fluid which in separate state are capable of having hydroxyl groups on the surface and a polymerized material, such linking occurring by reaction of an organic anhydride with the material rigid of structure prior to or after contact with the polymer or resin, and reaction with the polymerized material or polymerizable material prior to polymerization to form such. And, this invention specifically relates to the new compositions of matter resulting from such linking and reactions, and to the polymerizable compositions formed in carrying on the invention, and to the compositions of material rigid of structure and organic anhydride formed in carrying on the invention.

In still another specific aspect, this invention relates to new methods for producing high temperature resistant plastic compositions and products, and to new polymerizable plastic compositions and polymerized products therefrom, including co-polymers of polyester polymers and cyanurate and/or isocyanurate compounds filled with a filler material to which the co-polymers are linked chemically and/or physically by an organic anhydride, such new plastic products having valuable physical and chemical properties which make them especially useful in applications where resistance to temperatures in excess of 475 degrees F. is desirable, and it has been found that the laminates, castings, moldings, coatings, etc., of such are very useful for many structural purposes.

In still another aspect, this invention relates to new methods for coating surfaces, and to the coatings resulting therefrom, and by the new methods of our invention protective and/or decorative paints containing polymeric material are chemically and/or physically linked to surfaces by organic anhydrides, especially paint materials containing polyester polymers and specifically surfaces which are capable in the separate state of having hydroxyl groups on the surface thereof, and wherein the organic anhydride is reacted with the polymeric paint material and the hydroxyl groups on the surface, and this invention specifically relates to the compositions of matter resulting from such coating procedures.

In yet another specific aspect, this invention relates to new methods of sizing materials with sizing agents containing polymers wherein the sizing is chemically and/or physically linked to the material sized by an organic anhydride, especially sizing materials containing polyester polymers and specifically materials to size which are rigid of structure as distinguished from a readily flowable fluid and which in separate state are capable of having hydroxyl groups on the surface, and this invention specifically relates to the sized compositions of matter or material resulting from practicing the invention.

Polyester resins are widely used in a vast number of applications, and many different kinds of such resins are known. In particular, the unsaturated thermosetting polyesters, either alone or co-polymerized with other polymerizable materials, find wide application in many industrial uses. The most widely used high temperature resins for laminating, casting, molding, coating, etc., are comprised primarily of co-polymerizable mixtures of unsaturated polyester polymers and triallyl cyanurate and/or triallyl iso-cyanurate. Difficulty and unsatisfactory results are often encountered with high temperature laminates, etc., particularly due to unsatisfactory so-called wetting of the filler which is usually glass cloth or mat, cracking and crazing during the later states of curing being common, particularly on the surface of the product, and in many cases, the products severely darken after prolonged exposure to high temperatures. In making products by potting or casting with these resins containing polyester polymers trouble is often encountered due to this same unsatisfactory so-called wetting of the filler materials used, and such is only partially overcome by prolonged milling. In this regard, such unsatisfactory wetting of parts of foreign composition inserted into the resin during casting is commonly encountered. Poor adhesion and low strength results. Further, it is the common case that the moduli of elasticity of many of these materials is too low to permit their use, although they meet other requirements called for in a particular application for the plastic product.

So-called synthetic paints containing polyester polymers, usually called alkyd resins, require lengthy cure periods of up to 60 days before they can be readily handled, that is, washed or cleaned, and their adherence to many surfaces is very poor. This is also true in regard to coatings employed for sizing purposes containing these polyester polymers, and the adherence in many instances is so poor that the sized product is weak with very poor physical characteristics, and the sizing coating does not stand up to waterproof, etc., the material sized. By the new methods of our invention all of these difficulties encountered can be overcome.

As a result of practicing the new methods of our invention a product is produced wherein a polymerized resin containing a polyester polymer is chemically and/or physically linked to a material, such as a filler material, which is rigid of structure as distinguished from a readily flowable fluid and which in its separate state is capable of having hydroxyl groups on the surface thereof, such chemical and/or physical linkage being between the material and an organic anhydride, and between the organic anhydride and the polymerized polyester containing polymer or resin. Plastic products produced as a result of the new method of our invention have striking physical and chemical properties. Laminates produced from reinforcing fillers of glass fibers in fabric or mat form and polymerizable mixtures of a polyester polymer and triallyl cyanurate and/or triallyl iso-cyanurate with which an organic anhydride has been reacted in linking relation, stand higher temperatures for longer periods of time than those made without the use of an organic anhydride, up to 600 to 625 degrees F. for relatively long periods of time and up to 750 to 800 degrees F. for relatively short periods of time, have much less surface cracking and crazing upon curing, and are far less susceptible to water absorption and/or adsorption than those similar laminates known in the prior art. Synthetic paints containing polyester polymers and an organic anhydride when used to paint a surface of a material having hydroxyl groups on the surface thereof are actually reacted with the hydroxyl groups by the linking organic anhydride, to chemically and/or physically join the paint to the surface of the material. Many surfaces which could not previously be successfully painted with these so-called synthetic paints containing polyester polymers can now be painted and coated to stand all kinds of physical abuse due to the tight bond between the paint material and the surface of the material painted, peeling and chipping properties are greatly improved to give a very superior and long-lasting protective and/or decorative coating. This is likewise true in coating and sizing materials such as wool cloth, etc.

In the co-pending patent application of Joseph R. Galli, George I. Wheeler, and Robert B. Johnson, titled Method of Preparing Resin and Product Thereof, Serial No. 711,798, filed January 29, 1958, are disclosed new methods of preparing plastic products and new plastic products resulting from such methods wherein phosphorous is contained in the polymerized product, such new plastic products being particularly advantageous as high temperature resistant materials when formed from polymers or resins containing a polyester polymer and a cyanurate compound polymerizable therewith, the phosphorous being in either or both of the polyester portion of the molecule or the cyanurate portion of the molecule, and preferably introduced therein by the reaction of a phosphorous compound having a reactable halide with either or both of the polyester polymer and cyanurate compound polymerizable therewith. And, in co-pending patent application Serial No. 705,076, filed December 12, 1957, titled Iso-Cyanurate Polymers, inventors Joseph R. Galli, Dale E. German, and Bert H. Clampitt, are disclosed new methods and plastic products or resins wherein iso-cyanurate compounds are polymerized alone or copolymerized with other material polymerizable therewith, an important class of such other polymerizable material being polyester polymers. The plastic products resulting from the inventions of these inventors and their new and inventive methods have particularly good high temperature resistant properties. The processes of the invention of this application can be used to great advantage in the new methods of these co-pending patent applications, that is, incorporating the organic anhydrides to provide the reactive linkage between the polymerized material and the reinforcing filler material when it is one rigid of structure as distinguished from a readily flowable fluid and one which is capable of having hydroxyl groups on the surface thereof. The preferred high temperature plastic laminates thus produced have superior properties in many instances, for example, laminates wherein a fiber glass fabric or mat is used as the reinforcing filler material. Providing for the organic anhydride linking of our invention gives marked improvement to so-called high temperature resins, particularly polyester-cyanurate resins, polyester-iso-cyanurate resins, and the polyester cyanurate resins wherein phosphorous has been added to one or both of the polyester and cyanurate. The plastic product such as laminates resulting can stand temperatures to 650 degrees F. and above for long periods of time. This makes them particularly valuable when used to fabricate high speed aircraft, guided missiles, and the like.

We have invented a new process wherein an organic anhydride is reacted with a composition of matter rigid of structure as distinguished from a readily flowable fluid which has hydroxyl groups on the surface thereof. The organic anhydride is reacted with these hydroxyl groups to chemically and/or physically bind the two together. As a specific preferred embodiment of our invention we have invented a new process wherein an organic anhydride is reacted with a resin containing a polyester polymer before or after such is polymerized and with a material rigid of structure as distinguished from a readily flowable fluid and which has hydroxyl groups on the surface thereof, to provide a chemical and/or physical linking between the polymerized resin containing a polyester polymer and the material rigid of structure. As a new composition of matter we have invented a material rigid of structure as distinguished from a readily flowable fluid which in separate state is capable of having hydroxyl groups on the surface thereof and chemically and/or physically linked thereto an organic anhydride, and as a preferred specific embodiment such a new composition of matter and therewith a resin containing a polyester polymer in polymerized form which is chemically and/or physically linked to the organic anhydride.

It is an object of this invention to provide new reactions for organic chemical anhydrides, and to provide new compositions of matter and materials resulting from such new reactions.

It is another object of this invention to provide a new process wherein organic chemical anhydrides are reacted with materials rigid of structure as distinguished from a readily flowable fluid and having hydroxyl groups on the surface thereof, and to provide new compositions of matter and materials resulting from reaction of the anhydrides from the materials rigid of structure.

Another object of this invention is to provide a new process for reacting organic anhydrides with polymerized or polymerizable chemical compositions, and to provide new products and polymers or resins resulting from such new process.

It is yet another object of this invention to provide a new process for chemically and/or physically bonding a polymerized or polymerizable composition of matter and a material rigid of structure as distinguished from a readily flowable fluid, and to provide new compositions of matter with such bond present therein.

Yet another object of this invention is to provide new high temperature resistant plastic products or compositions of matter wherein a copolymerized resin of a polyester polymer and a cyanurate and/or iso-cyanurate compound polymerizable therewith is chemically and/or physically linked and bonded to the surface of a reinforcing filler material rigid of structure as distinguished from a readily flowable fluid by a linking organic anhydride which is reacted with the polymerized resin and the material rigid of structure, and to provide polymerizable compositions of matter to produce such plastic products, and to provide chemically and/or physically bonded materials rigid of structure and an organic anhydride to produce such plastic products, and to provide new methods of producing such linked or bonded and reinforced plastic products.

A further object of this invention is to provide new polymerizable materials and new reinforcing filler materials which can be used in the usual shop fabrication processes and procedures to produce plastic or resin parts or products of superior heat resistance, radio frequency transparency and moisture resistance, more specifically such products or polymers capable of structurally functioning at temperatures within the range of minus 80 degrees C. to plus 290 degrees C., the extremes of celestial temperature, and at temperatures resulting from aerodynamic heating and heat from propulsive units powering high speed aircraft and guided missiles of up to 800 degrees F. for relatively short periods of time and at temperatures up to 650 to 750 degrees F. for relatively long periods of time, and to provide such plastic or resins product capable of properly functioning under atmospheric conditions wherein the relative humidity is from zero to 100 percent.

Still another object of this invention is to provide a new process to produce new plastic products, such being conveniently used to make laminates by the usual and common and low pressure procedures and wherein the resulting laminate has the resin material chemically and/or physically bonded to the reinforcing filler material, such resulting laminate having superior strength and retaining such strength at high temperatures and being free of cracks and craze after cure and in use in comparison to the high temperature resistant laminates of plastic materials known in the prior art, particularly laminates produced from polymerizable masses of polyester polymers and cyanurate and/or iso-cyanurate compounds polymerizable therewith and glass fibers in the form of a fabric or mat.

It is another object of this invention to provide new protective and/or decorative coatings, and to provide the protected and/or decorated material resulting from using the coatings in the new method for protectively and decoratively coating which it is an object to provide.

Still another object of this invention is to provide a new method for protectively and/or decoratively covering a surface of a material rigid of structure as distinguished from a readily flowable fluid wherein the protective and/or decorative coating material is chemically and/or physically bonded to the surface of the material rigid of structure.

A further object of this invention is to provide new so-called synthetic paints which can be used in the new process which it is an object to provide, such paints when used in the process having a polyester polymer contained therein and which after use is chemically and/or physically linked to the material of rigid structure by an organic anhydride reacted with the material of rigid structure and the polyester polymer in the paint.

Another object of this invention is to provide new so-called synthetic paints containing a polyester polymer which will when used result in a superior decorative and/or protective coating which will last longer, be more resistant to abrasion, chipping, peeling and the like, and which can be washed and cleaned sooner and more frequently than the paints of the prior art containing such polyester polymers known as alkyd resins.

It is also an object of this invention to provide new sizing procedures, new sizing materials used in such procedures, and to provide new sized materials resulting from such procedures.

Still another object of this invention is to provide a new method to size materials rigid of structure as distinguished from a readily flowable fluid to produce new sized materials wherein the sizing is chemically and/or physically bonded to the material.

Yet another object of this invention is to provide a new method for chemically and/or physically bonding sizing materials containing polyester polymers to a material rigid of structure as distinguished from a readily flowable fluid, and to provide new sized materials resulting from the new method having an organic anhydride linking the material rigid of structure and sizing containing the polyester polymer.

Also, a further object of this invention is to provide new materials rigid of structure as distinguished from a readily flowable fluid which are sized and which are more rugged, can stand more abuse and retain water repellancy, etc., than those like materials sized by sizing masses containing polyester polymers wherein the sizing material is not bonded to the material rigid of structure which bonding results from the new process of our invention.

Other objects and advantages of the new methods, new polymerizable masses, new materials rigid of structure as distinguished from a readily flowable fluid having an organic anhydride reacting therewith, new plastic resin products, new protectively and/or decoratively coated materials, and new sized materials, all of our invention, will become apparent to those skilled in the art upon reading this disclosure.

Following is a discussion and description of the new methods, polymerizable masses, and products of our invention, and it is to be understood that such discussion and description is not to unduly limit the scope of our invention.

In carrying on the new methods of our invention to produce the new compositions of matter of our invention an organic anhydride is employed, such being reacted with a material rigid of structure as distinguished from a readily flowable fluid and having hydroxyl groups on the surface thereof, such as a filler material used in producing reinforced plastic materials and products, or a structural material presenting a surface to be protectively and/or decoratively coated, or a fabric to be sized for waterproofing same. Any suitable organic anhydride can be employed. It is preferred to use an organic anhydride of at least dibasic acids wherein two of the carboxyl groups are on adjacent carbon atoms, more preferably wherein the total number of carbon atoms in the organic anhydride molecule is in the range of from 4 to 20, and still more preferably a dianhydride with a total number of carbon atoms in this range. We have found the following organic anhydrides to be very useful in the practice of our invention. However, the specific anhydrides set forth are by way of illustration and not limitation, and it is to be understood that such are not to unduly limit the scope of our invention. Preferred specific organic anhydrides are, anhydrides of monobasic acids, such as, acetic anhydride, propionic anhydride, butyric anhydride, iso-butyric anhydride, nonic anhydride, benzoic anhydride, perfluoropropionic anhydride, perfluoro-octanoic anhydride, and the like, and mixtures thereof; organic anhydrides of dibasic acids, such as succinic anhydride, maleic anhydride, adipic anhydride, phthalic anhydride, citrionic anhydride, mellitic anhydride, and the like, and mixtures thereof; polyanhydrides of polybasic acids, such as, pyromellitic dianhydride, the dianhydride of naphthalene 1,4,6,9-tetracarboxylic acid, the trianhydride of benzene hexacarboxylic acid, and the like, and mixtures thereof; and mixtures of such organic anhydrides.

As a new process of our invention, we have discovered that organic anhydrides can be reacted with compositions of matter rigid of structure as distinguished from a readily flowable fluid and which are capable of having hydroxyl groups on the surface thereof. When these compositions of matter rigid of structure have hydroxyl groups on the surface and are reactively contacted with the organic anhydride, the hydroxyl groups react with the organic anhydride to chemically and/or physically bond the material of rigid structure and organic anhydride together. We have found that this new reaction of our invention can be carried on with a great number of materials. In the following is set forth specific preferred compositions of matter rigid of structure as distinguished from readily flowable fluids and which are capable of having hydroxyl groups on the surface of the material. These preferred specific compositions of matter are presented by way of illustration and not limitation, and it is to be understood that such are not to unduly limit the scope of our invention. It has been found that the organic anhydrides can be reactively joined to inorganic solid compositions of matter, such as aluminum oxide, bauxite, silicates such as that of sodium, potassium, calcium, lead, and the like, titanium dioxide, silicon dioxide, zirconium dioxide, asbestos, aluminum metal in either sheet, powdered or shaped part form, concrete, brick, plaster, mica, China clay, sand, other metals such as the transition metals, for example, magnesium, titanium, zirconium, tin, and the like, in either sheet, powdered, or shaped part form, and the like; inorganic material rigid of structure as distinguished from a readily flowable fluid, such as, glass, preferably in its super cooled liquid state, and in the form of sheets, powdered, granulated, fibered in loose form or in the form of mats or fabric, and the like; cellulosic materials, such as, wood, paper, cotton, linen, rayon, and the like; wool; leather; wall board; and the like. All of these compositions of matter of rigid structure as distinguished from a readily flowable fluid normally have hydroxyl groups on the surface thereof under atmospheric conditions. Moisture in the air in contact with the materials brings about surface hydroxylation. And, if such surface hydroxylation is not present with the materials, exposure to air or other oxygen-containing gas having water vapor therein will result in hydroxyl groups being formed on the surface of the material. For example, freshly machined or formed aluminum sheeting or parts will in contact with the air react with the oxygen therein to form aluminum oxide on the surface, and moisture in the air will cause hydroxyl groups to be formed on the surface thereof. And materials not normally having hydroxyl groups on the surface at atmospheric conditions can be treated by impregnation, and the like, to provide such, for example, with a dispersion of aluminum oxide in an evaporative carrier. We have discovered that these hydroxyl groups are reactive with organic anhydrides though not present in a usual reaction medium.

The organic anhydride can be reacted with the reinforcing filling or other structural material having the hydroxyl groups on the surface thereof in any suitable manner. If desired, the anhydride can be dissolved in a suitable solvent in which the composition of matter having the hydroxyl groups on the surface thereof is immersed, or the solution can be brushed or sprayed onto such material, and in the latter case, it is desirable to use a solvent which will evaporate or which can be washed away after reaction to leave the anhydride on the material and reacted therewith. We have found it convenient and desirable to disperse the organic anhydride in finely divided form throughout an inert reaction medium which can be heated to a temperature in the range of from 25 to 200 degrees C. preferably, more preferably 50 to 125 degrees C., and we have had excellent results using xylene, petroleum distillate fractions, and the like, which can be boiled at atmospheric pressure in these preferred temperature ranges, and refluxed during the reaction. The final product can conveniently be washed free of unreacted organic anhydride, and air or oven dried free of the solvent or reaction medium. In these manners reinforcing fillers for plastic product laminates, such as glass fabric or mat, can be reacted with the organic anhydride to prepare same for use in the usual low pressure laminating shop operations, or such as aluminum parts for incorporating into casted, molded or laminated plastic parts can conveniently be reacted with the anhydrides by these methods. Materials such as cotton, paper, linen, wool, leather, and the like, can conveniently be reacted with the organic anhydrides by these methods to prepare same for sizing with polymerizable resin materials containing polyesters polymers alone or in admixture with other compounds polymerizable therewith. To prepare surfaces of structural materials for painting with alkyd resin paints, it is preferred to brush or spray the solution or dispersion of the organic anhydride onto the surface for reaction therewith, and to let the solvent or dispersing medium evaporate, etc., to prepare same for painting with a decorative and/or protective coating having an alkyd resin base. As will be set forth hereafter, the organic anhydride can be first reacted with the polyester polymer prior to its use for making plastic products, protectively or decoratively coating the surface of structural material, sizing such as paper, cotton, wool, leather, and the like.

In carrying on the new processes of our invention to produce the new polymerizable masses and products of our invention, by reacting the organic anhydrides with the polymerizable masses prior to contact of the polymerizable masses with the material rigid of structure as distinguished from a readily flowable fluid and having hydroxyl groups on the surface thereof, it has been found that the organic anhydrides set forth hereinbefore can be used and such are preferred. However, these are given by way of illustration and not limitation, and it is to be understood that such are not to unduly limit the scope of our invention. Any suitable polyester polymer can be used in practicing the invention, and such can be employed alone or in mixture with another material polymerizable therewith, and this other material can be reactive with the organic anhydride, if desired. The preferred polymerizable masses to be used in the practice of the invention contain an unsaturated polyester polymer or resin which is capable of polymerization, preferably linear formed polyester polymers made from a polyalcohol and a polyacid with either or both of the polyalcohol and polyacid being unsaturated. By way of illustration and not limitation, the following polyalcohols, polyacids, and polyesters are set forth as desirable ones to be used in the preparation of the polyester polymers containing polymerizable acids which can be employed in our invention, and it is to be understood that such are not to unduly limit the scope of our invention, polyalcohols such as ethylene glycol, propylene glycol, butylene glycol, pentylene glycol, 2,5-dimethyl-3-hexyne-2,5-diol, 3,6-dimethyl, 4-octyne-3,6-diol, 2-butene-1,4-diol, and the like, and mixtures thereof, polyacids such as phthalic acid, maleic acid, fumaric acid, succinic acid, adipic acid, and the like, and mixtures of such polyacids. Specific preferred unsaturated polyesters capable of reaction with the organic anhydrides, and capable of polymerization after such reaction are, for example, polyethylene glycol maleate, polyethylene glycol fumarate, polypropylene glycol maleate, polypropylene glycol fumarate, diethylene glycol maleate phthalate, polyneopentyl glycol fumarate, diethylene glycol fumarate maleate, polypropylene glycol maleate, polypropylene glycol maleate phthalate, polypropylene glycol fumarate phthalate, the cyclopentadiene adduct of polyesters such as, polyethylene glycol maleate cyclopentadiene adduct, the polyesters known commercially as paint, alkyds, such as those synthesized from glycerol and phthalic anhydride, those from and with naturally occurring triglycerides, and the like, and mixtures of such polyester polymers. These thermosetting and other unsaturated polymerizable polyester polymers which can be used in carrying on our invention can conveniently be prepared by the method of Kropa, Patent No. 2,510,503, or prepared by analogous methods, or prepared by suitably modifying such methods.

While any suitable polyester polymers can be employed in carrying on the new processes of our invention, it is preferred that the polyester have a molecular weight in the range of from 500 to 1500, more preferred 600 to 900. The organic anhydride can be contacted with the polyester polymer while the polyester is alone or in the presence of other materials, or the reaction can be carried out in a suitable solvent medium or dispersing medium. We have found it convenient and preferred to add the organic anhydride to the resin in weighed amounts, and thoroughly mixing and heating with stirring to a temperature of from 25 to 250 degrees C., more preferably 50 to 150 degrees C., this depending as those skilled in the art will understand on the particular resin and anhydride used, and we have found it desirable to continue stirring at a temperature in these ranges until solution and reaction of the organic anhydride is complete. Depending on the reactive materials, this solution will usually be complete in from 1 minute to 2 hours, more usually 5 minutes to 30 minutes, which are the preferred reaction times for carrying on the step of our invention of reacting the organic anhydrides with the polyester polymer containing material. It has been our experience in carrying on our invention that disappearance of the organic anhydride into solution will normally be accompanied by a slight exotherm and frothing of the resin, and reaction can be considered to be complete, it has been found, when these visual and measurable changes cease, or when the organic anhydride has disappeared as such from the reaction zone. Any suitable amount of organic anhydride can be used in the practice of our invention, preferably an amount in the range of 0.5 to 10 parts by weight per 100 parts by weight of reactable resin, more preferably from 2 to 5 parts by weight per 100 parts by weight of reactable resin material. These preferred reaction conditions and amounts of reactive materials are given by way of illustration and not limitation, and it is to be understood that such are not to unduly limit the scope of our invention. Further, it has been found that reaction conditions and amounts of reactive materials set forth hereinbefore can be used and are preferred when the polymerizable mass with which the organic anhydride is reacted contains in addition to the polymerizable polyester polymer another compound copolymerizable therewith, a discussion of such applicable co-polymerizable materials being set forth hereinafter.

In practicing the new processes of our invention to produce the new polymerizable masses of our invention and products of our invention to result in a composition of matter wherein the polymerized resin is linked to the surface of a material rigid of structure and being capable in the free state of having hydroxyl groups on the surface thereof, such linking being by an organic anhydride reacted with the material and the polymerized polymer or resin, a polymerizable mass can be employed containing a polyester polymer and another compound polymerizable therewith. The organic anhydride can be and is preferably reacted with the polyester polymer prior to mixing with the other compound polymerized therewith, or preferably after mixture of the co-polymerizable materials. The organic anhydrides and polyester polymers set forth hereinbefore can be used in practicing our invention in these manners, and such are preferred. Also, the reaction conditions and amounts of reactive materials set forth hereinbefore can be used and are preferred. Any suitable material which is polymerizable with the polyester can be employed, preferably a compound polymerizable therewith having a —CR=CR— structural grouping where each R is selected from the group consisting of hydrogen, an alkyl radical and an aryl radical, more preferably such compounds wherein the total carbon atoms in the molecule is in the range of from 2 to 20. The following compounds and classes of compounds have been found desirable to use in practicing our invention as compounds polymerizable with polymerizable polyester polymers, and they are offered by way of illustration and not limitation, and are not to unduly limit the scope of our invention. These preferred compounds and classes of compounds are such as, cyanurate compounds polymerizable with polyester polymers, isocyanurate compounds polymerizable with polyester polymers, styrene, methyl methacrylate, diallyl phthalate, liquid polybutadiene resins, and the like, and mixtures thereof.

In a particularly preferred specific embodiment of our invention, the polyester polymer polymerizable resin or mass contains a cyanurate compound polymerizable with the polyester. These polymerizable masses are contacted with reinforcing filler materials to produce plastic products of high temperature resistance and low cracking and crazing of the surface, and these particular specific embodiments of the invention can be carried out by the usual and common laminating, potting, casting and molding procedures to produce the plastic or resin products. The organic anhydrides can be reacted with either or both of the resin and reinforcing filler. Most specifically, very good and physically superior high temperature laminates have been prepared when using fibered glass as the reinforcing filler in mat and/or fabric form, most preferably a heat cleaned fabric or mat free of any sizing. The cyanurate compound in the polymerizable mass with the polyester polymer can be a single polymerizable cyanurate or a mixture of such cyanurate compounds, the cyanurate compounds being unsaturated and those which when co-polymerized with polyesters produce a thermosetting resin being most preferred. In the following is set forth specific preferred cyanurate compounds which can be used in the practice of our invention to produce high temperature resistant plastic products. These cyanurates are given by way of illustration not limitation, and it is to be understood that such are not to unduly limit the scope of our invention. Preferably we employ polymerizable cyanurates having the structural formula (1)
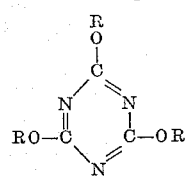

The compounds of Formula 1 have the generic name trialkenyl cyanurates where R represents the hydrocarbon radicals allyl, butenyl, pentenyl, hexenyl, heptenyl, octenyl, nonenyl, etc., both straight chain and branch chain compounds. In the practice of our invention using the co-polymerizable cyanurates of Formula 1 it is preferred that each R be represented by the general structural formula (2)
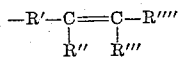

where R' is an alkyl group or radical, and R'', R''', and R'''' are hydrogen or an alkyl group, preferably such that the sum of the carbon atoms in the groups or radicals R', R'', R''', and R'''' does not exceed 18. One or more of the R radicals or groups in the structural Formula 1 can, if desired, be a group or radical having multiple unsaturation, for example, pentadienyl, heptadienyl, octadienyl, hexatrienyl, etc. And, we have found that our invention can be practiced using cyanurate compounds where up to two of the R groups of Formula 1 can be saturated groups or radicals, saturated with such as halogens added to the carbon atoms of double bonds, preferably chlorine or bromine, silyls, etc., if desired.

Another preferred specific class of cyanurate compounds to be used in the practice of our invention to provide a very advantageous chemically and/or physically linked laminate or other plastic product, that is, wherein the polymerized polyester and cyanurate resin or polymer is physically and/or chemically linked to the reinforcing filler by an organic anhydride, have the structural formula (3)
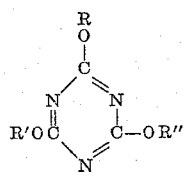

wherein R preferably represents an unsaturated group or radical of the class or type as set forth hereinbefore in relation to structural Formula 1, and R' and R'' in Formula 3 represent saturated alkyl groups or radicals, preferably having carbon atoms in the range of from 1 to 9, or unsaturated alkenyl groups or radicals, the same or different than R, or such alkenyl groups which have been saturated with such as hydrogen, halogens, silyls, etc.

In the following are specific cyanurate compounds which are preferably used in carrying on our invention to produce high temperature resistant plastic products, and those set forth are preferred. They can be used alone with a suitable polyester polymer, or they can be used in conjunction with another polymerizable compound and a suitable polyester. The specific compounds listed are by way of illustration and not limitation, and it is to be understood that they are not to unduly limit the scope of our invention. These most preferred cyanurate compounds all have in common that there is no hydrogen substituted on a carbon atom in the cyanurate ring, and at least one of the substitutions on a carbon atom in the cyanurate ring has at least two carbon atoms in the chain and at least single unsaturation, such as, alkenyl esters, for example, triallyl cyanurate trimethallyl cyanurate, triethallyl cyanurate, tributenyl-2 cyanurate, tributenyl-3 cyanurate, tri(3-methyl) butenyl-3 cyanurate, tri(2-methyl) butenyl-3 cyanurate, tripentenyl-4 cyanurate, tri(3-methyl) pentenyl-2 cyanurate, tri(3-methyl, 2-ethyl) pentenyl-3 cyanurate, and the like; alkenyl esters where only two of the substitute groups on the ring have unsaturation, for example, methyl diallyl cyanurate, ethyl diallyl cyanurate, propyl diallyl cyanurate, butyl diallyl cyanurate, pentyl diallyl cyanurate, and the like; alkenyl esters where only one of the substituted groups on the ring has unsaturation, for example, dimethyl allyl cyanurate, diethyl allyl cyanurate, dipropyl allyl cyanurate, dibutyl allyl cyanurate, dipentyl allyl cyanurate, and the like; tri-substituted compounds where each substituted group has double unsaturation, for example, tripentadienyl-2,4 cyanurate, tri(3-methyl) pentadienyl-2,4 cyanurate, and the like; triheptatrienyl-2,4,6 cyanurate, and the like; aromatic esters of cyanuric acid, for example, tristyrenyl cyanurate, tri(allyl benzyl) cyanurate, and the like; and mixtures thereof. These and other cyanurate compounds can conveniently be produced by the methods of Dudley as set forth in U.S. Patents Nos. 2,510,564, and 2,537,816, or by analogous procedures and/or modifications thereof. For the best results it has been found desirable to practice our invention with cyanurate compounds which have been refined and purified by such as distillation, recrystallization, etc., before they are used as co-polymerizable materials.

To produce products of particularly high temperature resistance and low surface cracking and crazing, we have found it desirable that the polymerizable mass containing the polyester polymer and cyanurate compound polymerizable therewith have such of these compounds where phosphorous is in the molecule of one or the other. This can be accomplished by the methods of Galli et al. as set forth in copending patent application Serial No. 711,798, referred to hereinbefore. Briefly, the phosphorous is introduced into the molecule of the co-polymerizable materials by reacting either or both of the polyester polymer and cyanurate compound with a phosphorous compound having a reactable halide, preferably compounds of tri or pentavalent phosphorous having a reactable halide, most preferably phosphorous trichloride and phosphorous oxychloride. The phosphorous can be introduced into the molecule or molecules of the polymerizable mass in practicing our invention either before or after reaction with the organic anhydride, and the conditions of reaction are preferably the same as the Galli et al. disclosure, namely most preferably at a reaction temperature in the range of from 100 degrees to 120 degrees C., for a reaction time of from 30 minutes to 2 hours, and with the reacting phosphorous compound present in an amount of from 0.5 to 2.5 parts by weight per 100 parts by weight of the reactable cyanurate compound and/or polyester polymer with or without the organic anhydride having been reacted with the polyester. With these preferred polymerizable masses, it has been found that the preferred reaction conditions and amounts of reactants in regard to the organic anhydrides as set forth hereinbefore can be used, and such are preferred.

Polymerizable masses containing polyester polymers, preferably as set forth hereinbefore, and iso-cyanurate compounds copolymerizable therewith are preferably used in practicing our invention to produce high temperature resistant plastic products wherein the polymerized material is chemically and/or physically bonded to reinforcing fillers rigid of structure by a linking organic anhydride reacted with the filler and the polymerized material. What has been set forth hereinbefore in regard to cyanurate compounds and polyester polymers has been found to be equally applicable to iso-cyanurate and polyester polymerizable masses, and the reaction with organic anhydrides can be carried on in the same manners. In practicing our invention the following iso-cyanurate compounds are preferred, such being set forth illustratively and not in a limiting sense, and it is to be understood that the specific classes of iso-cyanurates and compounds listed are not to unduly limit the scope of our invention. Preferred iso-cyanurate compounds applicable to our invention have the structural formula (4)
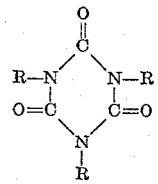

Compounds of the Formula 4 bear the generic name tri-alkenyl iso-cyanurates where R represents the hydrocarbon radicals allyl, butenyl, pentenyl, hexenyl, heptenyl, octenyl, nonenyl, etc., both straight chain and branch chain compounds. In these preferred compounds, R is preferably represented by the general structural formula (5)
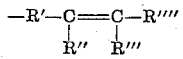

where R′ is an alkyl group, and R″, R‴, and R⁗ are hydrogen or an alkyl group, preferably such that the sum of the carbon atoms in the groups or radicals R′, R″, R‴, and R⁗ does not exceed 18. Further, it is preferred to use compounds wherein one or more of the R radicals in the structural Formula 4 in the group of radicals have multiple unsaturation, for example, pentadienyl, hexadienyl, heptadienyl, octadienyl, hexatrienyl, etc. And it has been found that up to two of the R groups in Formula 4 can be saturated, such as with halogens added to the carbon atoms of double bonds, preferably chlorine or bromine, silyls, etc., if desired.

Iso-cyanurate compounds of the structural formula (6)
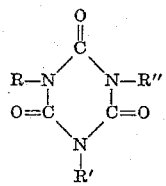

can conveniently be employed in practicing our invention in admixture with a polyester polymer co-polymerizable therewith, where in Formula 6 R preferably represents an unsaturated group or radical of the class or type as set forth hereinbefore in relation to structural Formula 4, and R′ and R″ in Formula 6 represents hydrogen or saturated alkyl groups or radicals, preferably having carbon atoms in the range of from 1 to 9, or unsaturated alkenyl groups or radicals, the same or different than R, or such alkenyl groups which have been saturated with such as hydrogen, halogens, silyls, etc.

Preferred specific iso-cyanurate compounds are set forth in the following by way of illustration and not by way of limitation, and it is to be understood that such are not to unduly limit the scope of our invention. These preferred iso-cyanurate compounds have in common that at least one of the substitutions on the iso-cyanurate ring has at least two carbon atoms in the chain and at least single unsaturation, such as tri-substituted compounds where each substituted group has single unsaturation, for example, triallyl iso-cyanurate, trimethallyl iso-cyanurate, triethallyl iso-cyanurate, tributenyl-2 iso-cyanurate, tributenyl-3 iso-cyanurate, tri(3-methyl) butenyl-3 iso-cyanurate, tri(2-methyl) butenyl-3 iso-cyanurate, tripentenyl-2 iso-cyanurate, tri(3-methyl) pentenyl-2 iso-cyanurate, tri(3-methyl, 2-ethyl) pentenyl-3 iso-cyanurate, and the like; tri-substituted compounds where each substituted group has double saturation, for example, tripentadienyl-2,4 iso-cyanurate, tri(3-ethyl) pentadienyl-2,4 iso-cyanurate, and the like; di-substituted compounds where each of the substituted groups has single unsaturation, for example, diallyl iso-cyanurate, dimethallyl iso-cyanurate, and the like; N-methyl diallyl iso-cyanurate, and the like; (N-butenyl-3) diallyl iso-cyanurate, and the like; triheptatrienyl-2,4,6 iso-cyanurate, and the like; monoallyl-iso-cyanurate, and the like; and mixtures thereof. These iso-cyanurates compounds and others which can be used in the practice of our invention can conveniently be prepared by the method set forth in U.S. Patent No. 2,536,849, issued to Kaiser and Church, and by analogous procedures and/or modifications thereof; it is preferred that the iso-cyanurate compounds be relatively pure to give the best results in plastic products produced.

The new linked or bonded plastic products of our invention are made by any suitable polymerization process. It is preferred that the invention be practiced by the so-called bulk or lamination processes of polymerization. As has been set forth hereinbefore, in producing these high temperature resistant products the organic anhydride can be reacted with the reinforcing filler prior to use of the filler in the polymerization process, that is, laminating, potting, casting, molding, etc. Or, the organic anhydride can be reacted with the polyester polymer alone or in mixture with the cyanurate or iso-cyanurate co-polymerizable compound. The inert filler is preferably one which has hydroxyl groups on the surface thereof and which itself has a temperature resistance equal to or greater than the polymer product it is desired to form.

An initiator of polymerization is preferably used, such preferably being added to the polymerizable mass with or without the organic anhydride reacted therewith. With polymerizable masses containing cyanurate and/or iso-cyanurate compounds and a polyester polymer, it is preferable to employ an organic peroxide initiator, such as benzoyl peroxide, diheptanol peroxide, tertiary-butyl perbenzoate, ditertiary butyl diperphthalate, tertiary-butyl perfumorate, ditertiary diperadipate, ditertiary butyl dipersuccinate, 1-hydroxycyclohexyl hydroperoxide-1, tertiary amyl hydroperoxide, diacetyl peroxide, 1-acetyl benzoyl peroxide, ditertiary butyl peroxide, 2,4-dichlorobenzoyl peroxide, cumene hydroperoxide, caprylyl peroxide, lauroyl peroxide, methyl ethyl ketone peroxide, hydroxyheptyl peroxide, dicumyl hydroperoxide, and the like, and mixtures thereof; hydrogen peroxide; and preferred other initiators are benzoin plus ultraviolet radiation; cobalt salts; stannic chloride; aluminum chloride, boron trifluoride; ionizing radiation; high voltage; and the like; and mixtures and combinations of these initiators can be used, if desired. These preferred initiators are set forth as being illustrative and not limiting, and it is to be understood that such are not to unduly limit the scope of our invention. Concentrations of the mass type initiators can vary over wide limits, it has been found.

In practicing our invention with the cyanurate and/or iso-cyanurate compound containing polymerizable masses, it has been found preferable to use from 0.1 to 10 parts by weight per 100 parts by weight of the polymerizable mass of these mass-type initiators. More preferably an initiator concentration in the range of from 0.1 to 2 parts by weight per 100 parts by weight of the polymerizable mass can be used. The initiators can be used alone, or they can conveniently be carried or supported on an inert or active carrier material. Depending on the polymerizable resin or mass and the initiator used, it is preferred to carry on the so-called bulk polymerization and reaction between the polymerizable mass and hydroxyl groups on the surface of the reinforcing filler, or between the reinforcing filler having the organic anhydride reacted therewith and the polymerizable mass at a temperature in the range of 50 degrees to 250 degrees C. when the initiator is an organic peroxide or a mixture of organic peroxides, more preferably at a temperature in the range of from 100 degrees C. to 150 degrees C. It has been found that lower polymerization temperatures can generally be used when the initiation of polymerization is brought about through the use of initiation such as radiation, high voltage, metal salts, etc., and successful organic anhydride linking and bonding has been accomplished at these relatively lower temperatures, which specifically preferably are in the range of from zero degrees to 120 degrees C., more preferably a temperature in the range of 10 degrees C. to 100 degrees C. Hard and tough plastic products have been produced using polymerization and reaction times in the range of from 30 minutes to 1½ hours, and reaction time in this range is preferred.

Following are examples of the new process of our invention to produce the new compositions of matter of our invention. These examples set forth preferred specific embodiments of our invention, and it is to be understood that the times, temperatures, pressures, quantities, materials, mechanical procedures, etc., set forth are not to unduly limit the scope of our invention.

*Example I*

A relatively large quantity of co-polymerizable resin was prepared by mixing together triallyl cyanurate and polyethylene glycol maleate cyclopentadiene adduct. Equal quantities by weight of each were used. The polyester used had a molecular weight of approximately 750. The cyanurate and polyester were heated to 60 degrees C., thoroughly mixed and cooled to room temperature.

*Example II*

The co-polymerizable resin resulting from Example I was mixed in an amount of 500 grams with pyromellitic dianhydride in an amount of 40 grams. The dianhydride was in finely divided form.

The mixture was heated to 120 degrees C. at atmospheric pressure for ½ hour while constantly stirring same. The resulting mixture was then allowed to cool to room temperature. Substantially all of the dianhydride disappeared from the reaction mixture.

A plastic laminate was prepared by standard vacuum bag laminating procedures using the polymerizable resin resulting from the reaction was the dianhydride and glass cloth. The glass cloth was a 181 weave and 301 finish grade fabric. It had hydroxyl groups on the surface thereof. After contact, the resin was gelled at 325 degrees F. for approximately 3 hours. An initiator was used of ½ part by weight per 100 parts by weight of resin of a mixed initiator consisting of ½ by weight of 2,4 dichlorobenzoyl peroxide and ½ by weight tertiary butyl perbenzoate, such initiator being mixed with the polymerizable resin prior to glass cloth contact. A post-cure for 3 hours at 500 degrees F. was carried out.

The resulting plastic laminate exhibited far greater transparency and much less surface crazing and cracking than was exhibited by a check laminate fabricated from a portion of the co-polymerizable resin produced as the product of Example I. The same laminating procedure was used with the check sample, and using the same initiator, and likewise using the same glass cloth.

*Example III*

A portion of the co-polymerizable product resulting from Example I was mixed with phosphorous trichloride, 100 parts by weight of the resin and 1 part by weight of the trichloride. The liquid phosphorous trichloride readily mixed with the co-polymerizable resin, and upon mixing an exothermic reaction occurred. Following the reaction occurring upon mixing, the resulting mixture was heated under vacuum, 1-2 mm. Hg, until it had been heated to a temperature of 110 degrees C. This temperature was maintained until reaction was complete between the phosphorous trichloride and the co-polymerizable resin.

The mixture resulting from the reaction was cooled to 20 degrees C. Cyanuric acid and allyl chloride resulted as by-products of the reaction. Centrifugation and filtering was used to remove the colloidal cyanuric acid from the mixture. The allyl chloride formed during the reaction was removed during the heating under vacuum, such being caught in a Dry-Ice acetone cold trap. The phosphorous was introduced into the co-polymerizable molecules of the resin.

*Example IV*

The co-polymerizable resin mass having phosphorous in the molecules produced by the procedures of Example III was mixed with pyromellitic dianhydride, 500 grams of the co-polymerizable resin and 15 grams of the dianhydride.

The resulting mixture was heated to 120 degrees C. at atmospheric pressure for ½ hour while constantly stirring the mixture. The dianhydride disappeared from the reaction zone, reacting with the co-polymerizable resin. The resulting mixture was then cooled to room temperature.

The resulting mixture having the dianhydride reacted therewith was used to fabricate a plastic laminate along with glass cloth, the same glass cloth as used in Example II herein. The same laminating techniques were used as in Example II, with the same period and gellation temperature, the same period of past cure and temperature, and using the same mixed initiator in the same relative amounts.

A check sample was run with a portion of the product resulting from Example III, using the same glass cloth, gellation time and temperature, post-cure time and temperature, mixed initiator in the same relative amounts, and the same standard vacuum bag laminating techniques.

The laminate prepared from the resin having the dianhydride reacted therewith was a great deal more transparent and much lighter in color than the laminate prepared from the resin free from the dianhydride. The laminate prepared from the resin having the dianhydride reacted therewith showed no surface cracking or crazing, and noticeable cracking and crazing was apparent in the other laminate, although it in itself was a very good laminate.

The two laminates were aged for 192 hours at 500 degrees F. After such aging, the laminate from the resin having the dianhydride reacted therewith had a modulus of elasticity at 500 degrees F. of 3.5 times $10^6$ pounds per square inch, as compared with a modulus of elasticity at 500 degrees F. of $2.5 \times 10^6$ pounds per square inch for the laminate prepared from the product of Example III and not having a dianhydride reacted therewith.

*Example V*

A portion of the product of Example III herein was mixed with phthalic anhydride, 500 grams of the co-polymerizable resin and 20 grams of the phthalic anhydride.

The mixture was heated to 120 degrees C. at atmospheric pressure for one-half hour while constantly stirring same. The phthalic anhydride which was in finely divided form disappeared and reacted with the resin. The resulting co-polymerizable mixture was allowed to cool to room temperature.

In the same manner set forth in Example II herein, this polymerizable mass was fabricated into a plastic laminate, using the same techniques, gellation time and temperature, post-cure time and temperature, glass cloth, and mixed initiator in the same relative amount.

Also, a check sample was run with everything exactly the same, except that the product of Example III herein was used free of reaction with an anhydride.

The laminate prepared from the resin having the phthalic anhydride reacted herewith had much greater transparency, lighter color, and less surface crazing and cracking than the check sample. However, the check sample was considered good in these respects.

*Example VI*

Pyromellitic dianhydride in an amount of 15 grams was added to 500 grams of the co-polymerizable product of Example I herein. To the resulting mixture was added 100 grams of finely divided aluminum oxide (99.9—% pure and —325 mesh).

The resulting mixture was heated at 150 degrees C. for ½ hour while constantly stirring same. The resulting mass was then cooled to room temperature, and benzoyl peroxide was added thereto in an amount of 1 part by weight per 100 parts by weight of the resin mixture. The co-polymerizable mass containing the initiator was then heated to 75 degrees C. and forced into a round mold. Various metal parts of aluminum which had been subjected to atmospheric conditions were forced into the polymerizable mass, and polymerization was carried out while heating for 4 hours at 325 degrees F. The resulting casting had a very smooth surface, and exceptionally strong adhesion of the polymerized resin to the metal parts was exhibited.

A check sample was run using a portion of the co-polymerizable resin product of Example I herein and a portion of like aluminum oxide in the same relative amounts, using the same procedures and conditions and like aluminum parts. The aluminum oxide dispersed much easier in the run wherein pyromellitic dianhydride was used, as compared to the check sample containing no anhydride. Likewise, adhesion to the metal parts was a great deal better in the case of the polymerization in the presence of the pyromellitic dianhydride than in the check sample where no anhydride was present.

The aluminum oxide had been exposed to atmospheric conditions, and undoubtedly had hydroxyl groups on the surface of the finely divided particles thereof.

The results indicate a much stronger co-polymerized resin as a result of reaction of the aluminum oxide with the pyromellitic dianhydride, and the direct reaction with hydroxyl groups on the metal parts was present even though aluminum oxide filler was present during the polymerization and reactions.

*Example VII*

A polyester polymer was synthesized by the preferred method of Kropa, Patent No. 2,510,503. The alcohol used in the synthesis was ethylene glycol, and the acids used were a mixture of 25% maleic anhydride, 35% phthalic anhydride, 20% succinic anhydride and 20% adipic anhydride. The resulting polyester of average molecular weight of about 1200 was purified and utilized in the following manner:

A mixture of the polyester and styrene was prepared. the polyester and styrene being present in equal parts by weight.

The resulting mixture was heated for ½ hours at 120 degrees C., while being constantly stirred and using a reflux condenser. The resulting mixture was cooled to room temperature.

*Example VIII*

A portion of the product resulting from Example VII herein was mixed with maleic anhydride, 500 grams of the co-polymerizable mass and 20 grams of the anhydride.

The resulting mixture was heated while being stirred under refluxing for ½ hour at 120 degrees C. The resulting reaction mixture was cooled to room temperature.

A plastic laminate was prepared using the co-polymerizable resin having maleic anhydride reacted therewith, using glass cloth as the reinforcing filler and conventional vaccum bag techniques. Gellation was carried on for ½ hour at 200 degrees F. Benzoyl peroxide in an amount of 1% by weight was used as initiator. The resulting plastic laminate had an exceptionally smooth surface and a very light color, and much smoother and lighter in color than a check laminate prepared from the same co-polymerizable mass and procedures without reacting the polymerizable resin with maleic anhyride.

Example IX

Polyneopentyl glycol maelate and triallyl iso-cyanurate were mixed together in equal amounts by weight. The molecular weight of the polyneopentyl glycol maleate was approximately 1000.

The polyester polymer and iso-cyanurate were heated together at 100 degrees C. for ½ hour while constantly stirring the mixture. Solution was complete.

Example X

A portion of the product resulting from Example IX herein was mixed with pyromellitic dianhydride, 500 grams of the polyester and iso-cyanurate co-polymerizable mixture and 15 grams of the pyromellitic dianhydride.

These materials were heated at 120 degrees C. for ½ hour while constantly stirring the mixture. The dianhydride reacted with and disappeared into the co-polymerizable resin mixture.

The resulting polymerizable mass was made into a plastic laminate using standard vacuum bag procedures, and glass cloth as the reinforcing filler. Approximately 2½ grams of a mixed initiator like that of Example II herein was employed, and the resin was gelled at 325 degrees F., for three hours. A post-cure of 3 hours at 550 degrees F. was used.

A check sample was run with a portion of the product of Example IX herein. The same procedures, materials, and conditions being used to produce the plastic laminate. The only difference was that no dianhydride was present in or reacted with the co-polymerizable resin mass.

The plastic laminate produced from the resin having the dianhydride reacted therewith had much greater transparency, lighter color, and far less surface crazing and cracking than the check sample plastic laminate prepared from the untreated or reacted product of Example IX herein. However, the plastic laminate of the check sample was considered a very good product.

Example XI

A portion of the product resulting from Example III herein, that is, the co-polymerizable mass having phosphorous in the molecules was mixed with perfluoro octanoic anhydride, 500 grams of the resin and 5 grams of the anhydride.

The mixture was heated at 120 degrees C. for ½ hour while constantly stirring same. The anhydride disappeared into and reacted with the co-polymerizable resin.

The resulting copolymer mass was fabricated into a plastic laminate using glass cloth as the reinforcing filler, and according to the procedures and at the conditions and with the materials at amounts set forth in Example II herein. After the post-cure for 3 hours at 500 degrees F. the resulting plastic laminate showed much lighter color, greater transparency, and smoother surface than the laminate prepared from the product of Example III herein which had not been reacted with an organic anhydride, when using the same procedures, conditions and amounts of materials.

Example XII

A piece of woven glass fabric of the heat cleaned type spec. 181–112 which was free of sizing was immersed in boiling xylene in which was dispersed powdered pyromellitic dianhydride. A reaction between the glass cloth and the dianhydride occurred, and the glass cloth took on a yellowish appearance while immersed in the xylene. The glass cloth was removed from the boiling xylene, washed with xylene free of dianhydride and then dried. The yellowish color remained after the drying. The cloth reacted with the pyromellitic dianhydride can be used as a reinforcing filler in plastic products to result in a linkage of a chemical and/or physical nature between the glass cloth and a polyester containing polymerized resin by the linking anhydride.

Example XIII

Pyromellitic dianhydride in finely divided form and in an amount of 50 grams was dispersed in approximately 1000 ml. of xylene. Three pieces of aluminum clad sheet (0.30 gauge) were placed in the mixture of xylene and anhydride, and then the mixture was refluxed. The xylene was boiled and refluxed for approximately 10 minutes. The pieces of aluminum sheet were removed from the xylene anhydride mixture, and dried in air. Excess powder was rubbed off the faces of the sheets.

The resulting aluminum sheets having pyromellitic dianhydride reacted therewith were painted with an alkyd enamel paint of common type having a polyester polymer with unreacted hydroxyl groups. The paint was a white baking alkyd enamel, and it was sprayed onto the sheets. The painted sheets of aluminum were air dried for 30 minutes, then baked at approximately 290 degrees F. for 35 minutes.

The same test was run as a check on three pieces of the same aluminum sheet and using the same paint and procedure, with the exception that the reaction step with the aluminum sheet and pyromellitic dianhydride was omitted.

Both of the painted and dried sheets of aluminum were tested for adhesion by ASTM standard test procedure D522–41.

The results of the tests in all cases showed a far stronger and better bond or adhesion in the case where the aluminum sheets had been reacted with the pyromellitic dianhydride.

The aluminum clad sheets used for the test had had prolonged exposure to the atmosphere prior to using it in the test procedures.

Example XIV

A dispersion of 50 grams of pyromellitic dianhydride and 1000 ml. of xylene was prepared. A piece of clean aircraft grade balsa wood was introduced into the dispersion, and the xylene was refluxed under boiling conditions for 10 minutes. The balsa wood was then removed, washed with pure xylene and carbon tetrachloride at elevated temperature, and dried at 150 degrees C. in an oven for ½ hour. After the drying operation the balsa wood was visually no different than before the test was run on it.

The resulting piece of balsa wood was coated with an epoxy resin (monomeric diglycidyl ether of bisphenol-A), and heated and held at a temperature of 100 degrees C. for an hour. At the end of this time the epoxy resin was thoroughly cured.

Since it is known that pyromellitic dianhydride is a curing agent for epoxy resins, it is clear that the pyromellitic dianhydride dispersed in the boiling xylene had reacted with the balsa wood of cellulosic structure, and such was present thereon to cure the epoxy resin.

Example XV

An alkyd base synthetic paint (the same as used in Example XIII herein) in an amount of 200 grams was mixed with 5 grams of pyromellitic dianhydride and 50 grams of toluene. The resulting mixture was heated and held at 110 degrees C. for 15 minutes. The resulting mixture was then allowed to cool to room temperature.

Aluminum clad sheet which had been exposed for a prolongated period to atmospheric conditions and having hydroxyl groups on the surface thereof (the same sheet as used in Example XIII herein) was painted and dried in the same manner as set forth in Example XIII herein. Three test sheets were run with the paint and under the same conditions.

The same experiment under the same conditions and with the same materials was run on three check sample sheets.

All six of the samples were tested by the standard ASTM test procedure for adhesion.

The samples run with the alkyd paint having the pyromellitic dianhydride reacted therewith were far superior in the property of adhesion than were the 3 samples run without the anhydride being present and reacted with the alkyd paint.

*Example XVI*

A mixture of finely divided aluminum oxide and pyromellitic dianhydride was prepared, 10 grams of the aluminum oxide and 7 grams of the anhydride. The aluminum oxide had been exposed to atmospheric conditions for a prolonged period of time.

The thoroughly mixed powders were placed in a standard differential thermal analysis apparatus, and heated up to 370 degrees C. at a rate of 10 degrees C. per minute.

An analysis of the resulting curve produced by the apparatus as a result of the test conclusively showed that an exothermic reaction occurred between the anhydride and the aluminum oxide.

The product resulting from the reaction was a hard, marble like substance with many holes therein.

*Example XVII*

A perfectly colorless glass fabric (spec. 181–112), that is, heat clean fabric, was immersed in boiling xylene having pyromellitic dianhydride dispersed therein. The anhydride was present in the amount of 50 grams and 1000 ml. of xylene was used. The glass fabric was in the xylene for 30 minutes while the xylene was boiled and refluxed.

The resulting glass cloth was thoroughly washed, drained dry and hung in a circulating air oven at 300 degrees F. for approximately 2 hours. The resulting glass fabric was vigorously brushed to remove any loose material thereon. The resulting product was a pale yellowish fabric, indicating that the anhydride had reacted with the glass cloth.

The glass cloth used in the reaction had been exposed to atmospheric conditions for a prolonged period of time.

*Example XVIII*

The glass fabric resulting from Example XVIII herein was employed in standard vacuum procedures to make a plastic laminate, using a polymerizable resin of polyethylene glycol maleate cyclopentadiene adduct and triallyl cyanurate which had been reacted with phosphorous trichloride to add phosphorous to the molecules of the polymerizable resin. The resulting plastic laminate was cured by standard procedures.

The resulting plastic laminate product was a very superior one, and the glass cloth reinforcing filler was extremely well wet, indicating a good chemical and/or physical bonding of the polymerized polymer to the reinforcing filler.

A control test was run using the same cloth but not reacted with an anhydride. Everything else was the same in the tests.

The plastic laminate of the control test was a good laminate but it had more porosity, indicating inferior wetting as compared to the laminate made from the glass fabric which had been reacted with pyromellitic dianhydride.

As will be evident to those skilled in the art, various modification of this invention can be made, or followed in the light of this disclosure and discussion, without departing from the spirit or the scope of the disclosure, or from the scope of the claims.

We claim:

1. A process comprising, bringing together (A) an organic anhydride of at least dibasic acids wherein two of the carboxyl groups are on adjacent carbon atoms and the carbon atoms in the anhydride molecule are in number in the range of from 4 to 20 and (B) a composition of matter comprising a polymerizable copolymer of (1) a polyester polymer formed from a polyhydric alcohol and an ethylenically unsaturated polycarboxylic acid and having a molecular weight of from 500 to 1500, and (2) triallyl iso-cyanurate, and reacting said anhydride with said copolymer, contacting a resulting product of said reacting with a solid material having hydroxyl groups on the surface thereof, and reacting said anhydride with hydroxyl groups, thereby chemically uniting said anhydride and solid material through the residue of said last-named reacting.

2. A process comprising, bringing together (A) pyromellitic dianhydride and (B) a composition of matter comprising a polymerizable copolymer of (1) a polyester polymer formed from a polyhydric alcohol and an ethylenically unsaturated polycarboxylic acid and having a molecular weight of from 500 to 1500, and (2) triallyl iso-cyanurate, with said dianhydride present in an amount of from 2 to 5 parts by weight per 100 parts by weight of said copolymer and reacting said dianhydride with said copolymer at a temperature of from 50 to 150 degrees C., for a period of time of from 5 to 30 minutes, contacting a resulting product of said reacting with a solid material having hydroxyl groups on the surface thereof, and reacting said dianhydride with said hydroxyl groups, thereby chemically uniting said anhydride and solid material through the residue of said last-named reacting.

3. A process comprising, bringing together (A) pyromellitic dianhydride and (B) a composition of matter comprising a polymerizable copolymer of (1) a polyester polymer formed from a polyhydric alcohol and an ethylenically unsaturated polycaboxylic acid and having a molecular weight of from 500 to 1500 and (2) triallyl cyanurate, with said dianhydride being in an amount of from 2 to 5 parts by weight per 100 parts by weight of said copolymer, and reacting said dianhydride with said copolymer at a temperature of from 50–150 degrees C. for a period of time of from 5 to 30 minutes, contacting a resulting product of said reacting with glass fibers having hydroxyl groups on the surface thereof, and reacting said dianhydride with said hydroxyl groups, thereby chemically uniting said dianhydride and said glass fiber through the residue of said last-named reacting.

4. A process comprising, preparing a mixture of triallyl isocyanurate and polyethylene glycol maleate cyclopentadiene adduct having a molecular weight of from 600 to 900 and pyromellitic dianhydride in an amount of from 2 to 5 parts by weight per 100 parts by weight of the copolymerizable mixture, reacting said dianhydride with at least one of said triallyl iso-cyanurate and polyethylene glycol maleate cyclopentadiene adduct at a temperature of from 50 to 150 degrees C. and for a period of time of from 5 to 30 minutes, adding an organic peroxide polymerization initiator to the resulting copolymerizable resin, contacting a resulting mixture with glass fibers having hydroxyl groups on the surface of the glass fibers, and polymerizing said resins to produce a plastic product and reacting said dianhydride with said hydroxyl groups, thereby chemically uniting said dianhydride and said glass fibers through the residue of said last-named reacting.

5. A process comprising, preparing a mixture of triallyl cyanurate, polyethylene glycol maleate cyclopentadiene adduct having a molecular weight of from 600 to 900, and a phosphorus compound selected from the group consisting of $POCl_3$, $PCl_3$, and mixtures thereof, reacting said phosphorous compound with at least one of said triallyl cyanurate and polyethylene glycol maleate cyclopentadiene adduct and recovering a resulting copolymerizable mixture, adding to said resulting copolymerizable mixture pyromellitic dianhydride in an amount of from 2 to 5 parts by weight per 100 parts by weight of said copolymerizable mixture, heating the resulting mixture at a temperature of from 50 to 150 degrees C. and for a period of time of from 5 to 30 minutes, adding an organic peroxide polymerization initiator to the resulting copolymerizable resin, contacting the resulting mixture with a glass fabric filler having hydroxyl groups on the surface of the glass fibers thereof, polymerizing said resin to produce a plastic laminate and reacting said anhydride with said hydroxyl groups during said polymerizing, thereby chemically uniting said anhydride and glass fibers through the residue of said last-named reacting.

6. A plastic laminate comprising, a glass fabric normally having hydroxyl groups on the surface thereof, said glass fabric being embedded within the cured residue of the reaction between pyromellitic dianhydride and a preformed polymerizable copolymer of triallyl cyanurate and polyethylene glycol maleate cyclopentadiene adduct having a molecular weight of from 600 to 900 and at least one of the component molecules of which has phosphorous therein, and said anhydride being chemically united to said glass fabric by the residue from the reaction of said dianhydride with said hydroxyl groups on the surface of said glass fabric.

7. A process comprising, bringing together (A) an organic anhydride of at least dibasic acids wherein two of the carboxyl groups are on adjacent carbon atoms and the carbon atoms in the anhydride molecule are in number in the range of from 4 to 20, and (B) a composition of matter comprising a polymerizable copolymer of (1) a polyester polymer formed from a polyhydric alcohol and an ethylenically unsaturated polycarboxylic acid and having a molecular weight of from 500 to 1500, and (2) triallyl cyanurate, and reacting said anhydride with said copolymer, contacting a resulting product of said reacting with a solid material having hydroxyl groups on the surface thereof, and reacting said anhydride with said hydroxyl groups, thereby chemically uniting said anhydride and solid material through the residue of said last-named reacting.

8. A process comprising, bringing together (A) an organic anhydride of at least dibasic acids wherein two of the carboxyl groups are on adjacent carbon atoms and the carbon atoms in the anhydride molecule are in number in the range of from 4 to 20, and (B) a composition of matter comprising a polymerizable copolymer of (1) a polyester polymer formed from a polyhydric alcohol and an ethylenically unsaturated polycarboxylic acid and having a molecular weigth of from 500 to 1500, and (2) a compound polymerizable with said polyester polymer selected from the group consisting of copolymerizable alkenyl substituted iso-cyanurates wherein said alkenyl radicals have from 2 to 9 carbon atoms, inclusive, and copolymerizable alkenyl substituted cyanurates wherein said alkenyl radicals have from 2 to 9 carbon atoms inclusive, and mixtures thereof, and reacting said anhydride with said copolymer, contacting a resulting product of said reacting with a solid material having hydroxyl groups on the surface thereof, and reacting said anhydride with said hydroxyl groups, thereby chemically uniting said anhydride and said solid material through the residue of said last-named reacting.

References Cited in the file of this patent

UNITED STATES PATENTS

| | | |
|---|---|---|
| 2,361,019 | Gerhart | Oct. 24, 1944 |
| 2,780,612 | Grotenhuis | Feb. 5, 1957 |
| 2,809,952 | Bolson | Oct. 15, 1957 |
| 2,824,085 | Cummings | Feb. 18, 1958 |
| 2,824,821 | Nischk et al. | Feb. 25, 1958 |